June 17, 1969  G. JEHN  3,450,445

TRACTION TREAD

Filed Dec. 13, 1966

INVENTOR
GUSTAV JEHN
By his Agent
Ernest Peter Johnson.

United States Patent Office 3,450,445
Patented June 17, 1969

3,450,445
TRACTION TREAD
Gustav Jehn, Box 283, Rimbey, Alberta, Canada
Filed Dec. 13, 1966, Ser. No. 601,462
Int. Cl. B62d 55/20
U.S. Cl. 305—39    4 Claims

ABSTRACT OF THE DISCLOSURE

A tractor track, having horizontal, flexible loops extending outwardly from the track surface is provided. The loops may be made of steel cable. They improve the traction of the track, particularly in muskeg.

---

This invention relates to a traction tread particularly adapted for use in soft ground, such as muskeg or mud.

The likelihood of getting vehicles, such as endless track and farm tractors, stuck in soft ground is common knowledge. This is particularly a problem in areas where the ground surface is formed of material such as muskeg. Muskeg is a wet, mossy type of material which is usually covered with a thin layer of fibrous material, cohesively strengthened by the roots of the vegetation growing thereon. The rotating treads or tracks of the vehicle tend to cut through the fibrous surface layer and the treads then penetrate into the wet underlying portion which is usually incapable of supporting the vehicle, particularly with its rotating treads tending to dig it down deeper. In short order, the vehicle body is hung up on the muskeg surface and the vehicle is hopelessly stuck.

There have, of course, been a variety of proposals made to alleviate this problem.

The most common approach used involves increasing the width of the traction treads of the vehicle so that less weight per square inch of tread is applied on the soft ground surface, whereby the "floatability" and traction of the vehicle is increased. There are practical limitations to this approach. For example, in the case of an endless track tractor, a wide track leads to excessive throwing of the track and breakage of the pads.

It is an object of this invention to provide a traction member for use with a vehicle which carries a traction tread particularly suited for operation in soft ground.

It is a further object of this invention to provide a traction member having a traction tread which will increase the traction of the vehicle in soft ground and which will also increase the floatability of the vehicle in soft ground of the muskeg type.

These and other objects are attained by providing a traction member comprising a supporting member carrying a plurality of flexible loops the parts of each loop defining a central aperture extending outwardly from the said supporting member to provide a tread. In a preferred embodiment the traction member comprises a supporting member having a main tread surface and carrying a plurality of flexible loops extending outwardly from the said supporting member to provide a lateral extension of the main tread surface.

Figure 1:
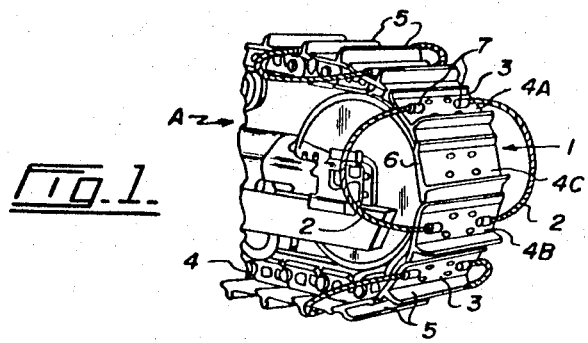
Figure 2:
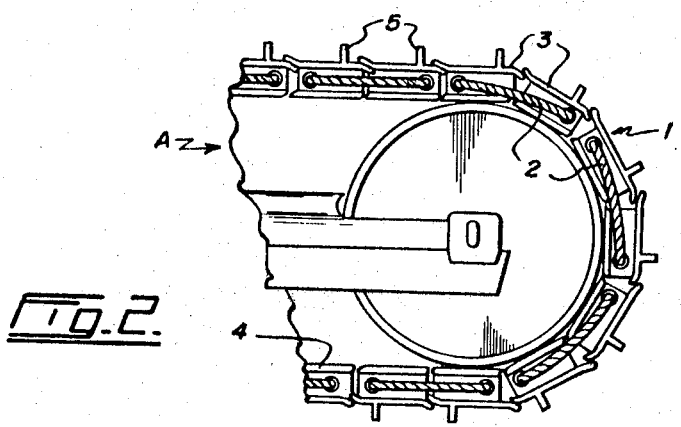

The invention will be more fully understood from the following description of preferred embodiments as read in conjunction with the accompanying drawings in which:

FIGURE 1 is a perspective view of the invention incorporated in a vehicle of the endless track type; and FIGURE 2 is a side plan view of an alternative embodiment of the invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Referring now to FIGURE 1, the character A designates a supporting member comprised of a conventional endless track having a main tread surface 1 and carrying a plurality of flexible loops 2. The supporting member A and the plurality of flexible loops 2 together comprise the traction member.

The main tread surface 1 of the supporting member A is provided by the outer faces of the track grouser shoes 3 which are bolted on to the endless chain 4. Vertical grouser bars 5 projecting from the grouser shoes 3 provide the main tread surface 1 with traction means.

A plurality of loops 2 formed of strong, flexible metal cable are secured to the upper faces of the grouser shoes 3. The flexible loops 2 extend outwardly from the edges 6 of the grouser shoes 3 substantially in the plane of that portion of the main tread surface 1 to which they are adjacent. In this manner, the flexible loops 2 provide a lateral extension on the main tread surface 1. In the particular embodiment illustrated, the flexible loops 2 are shown extending outwardly on both sides of the main tread surface 1.

The flexible loops 2 may be provided by securing the ends of short lengths of cable in sockets 7 by any suitable means such as welding. A pair of sockets 7 is provided to accommodate the ends of each flexible loop 2. Sockets 7 are shown in FIGURE 1 secured to the faces of grouser shoes 4A, 4B, spaced by a third grouser shoe 4C. It will be readily appreciated that the flexible loops 2 may be secured to the grouser shoes 3 using any other suitable means and that the particular spacing of the flexible loops 2 is a matter of choice.

Instead of being secured to the supporting member A in the plane of the main tread surface 1, as shown in FIGURE 1, the flexible loops 2 may alternatively be substantially disposed in a plane parallel to the plane of that portion of the said main tread surface 1 to which they are adjacent. As shown in FIGURE 2, the flexible loops 2 may be secured to the supporting member A at a point closer to its centre. In this manner the flexible loops 2 only come into contact with the ground surface when it is soft and the supporting member A commences sinking into the ground.

The essence of the invention resides in the provision of a tread partly or completely formed of loops 2 which are flexible. It is found that rigid loops have a downward cutting action when pressed by the weight of the vehicle into material such as fibrous muskeg. That is, the edges of rigid loops tend to knife through the fibrous surface layer with the result that the tread breaks through into the wet underportion. We have found that if the loops 2 are provided in a flexible form, they do not provide the objectionable cutting action to the same degree as do rigid loops. Instead, each flexible loop 2 tends to grip onto a segment of the cohesive surface layer of the muskeg or other similar material and thereby utilizes the fibrous reinforcing of the said layer to provide flotation of the vehicle. As a result, the main treads of the vehicle do not so easily cut through into the wet underportion, but tend rather to float on the surface layer.

In addition, we have found that the provision of the flexible loops 2 on a vehicle supporting member results in better traction in soft ground. The flexible loops 2 are self cleaning and, as a result, do not lose traction usefulness due to the build-up of coated mud to the same degree that conventional traction treads do.

While the loops must be flexible, they preferably should have sufficient rigidity to normally maintain themselves substantially parallel to the grouser shoes 3 to which they are secured. For example, with vehicles of the endless track type, we have found that one and one-eighth inch steel cable will provide loops 2 which are flexible in accordance with the needs of the invention but are still rigid enough to normally maintain themselves in substantially the same plane as the grouser shoes 3 to which they are secured.

The extent of outward projection of the flexible loops 2 is a matter of choice. We have found that a flexible loop 2, formed from one and one-eighth inch steel cable, is suitable for the purpose intended if it projects about one foot outwardly from the edges 6 of the grouser shoes 3 of a medium sized endless track tractor. The extent of projection of the flexible loops 2 on the inner side of the main tread surface 1 will be limited by the room available between the supporting member A and the vehicle body.

In operation, the flexible loops 2 carried by the supporting member A form a lateral extension of the main tread surface 1 and are rotated and brought into contact with the ground as is the said main tread surface 1.

In the drawings the invention is illustrated incorporated as part of an endless track tractor, providing a lateral extension of the main tread surface 1 of the machine. It will be under stood that the invention may be utilized with other wheeled and tracked vehicles to provide a lateral extension of their main tread surfaces.

In addition, it is contemplated that the flexible loops may be utilized to provide the entire tread surface. For example, a supporting member comprising an endless chain or belt, driven by means such as a sprocket arrangement, may be equipped with outwardly extending flexible loops to provide the entire tread surface.

It is to be further understood that the form of the invention herewith shown and described is to be taken as a preferred embodiment. Various changes may be made in the shape, size and arrangement of the loops. For example, flexible tubing may be substituted for the steel cable loops disclosed. The present disclosure has been made only by way of example and changes in the detail of construction and combination and arrangement of parts may be resorted to without departing from the spirit and scope of the invention as herein claimed.

What I claim as my invention is:

1. A traction member comprising: a supporting endless track member having a main tread surface; and a plurality of separate, V-shaped flexible loops carried by the said supporting member extending laterally outwardly from the said tread surface to provide a lateral extension thereof.

2. A traction member according to claim 1 wherein the said flexible loops are formed of metal cable.

3. A traction member according to claim 1 wherein each of the said loops extends outwardly from the said main tread surface substantially in the plane of that portion of the said main tread surface to which the said loops is adjacent to provide a lateral extension thereof.

4. A traction member according to claim 1 wherein each of the said loops extends outwardly from the said main tread surface substantially in a plane parallel to the plane of that portion of the said main tread surface to which the said loop is adjacent to provide a lateral extension thereof.

References Cited

UNITED STATES PATENTS

| | | | |
|---|---|---|---|
| 2,252,027 | 8/1941 | Pasquarella | 152—221 X |
| 2,351,647 | 6/1944 | Wales | 305—40 X |
| 2,470,801 | 5/1949 | Boltman | 305—54 |
| 2,645,532 | 7/1953 | Hollenkamp | 305—54 |
| 2,667,386 | 1/1954 | Mathisen | 305—35 |
| 3,210,133 | 10/1965 | Swanson | 305—35 |

RICHARD J. JOHNSON, *Primary Examiner.*

U.S. Cl. X.R.

305—54

UNITED STATES PATENT OFFICE
CERTIFICATE OF CORRECTION

Patent No. 3,450,445                                          June 17, 1969

Gustav Jehn

It is certified that error appears in the above identified patent and that said Letters Patent are hereby corrected as shown below:

Column 4, line 8, "V-shaped" should read -- U-shaped --.

Signed and sealed this 17th day of February 1970.

(SEAL)
Attest:

Edward M. Fletcher, Jr.                            WILLIAM E. SCHUYLER, JR.
Attesting Officer                                       Commissioner of Patents